United States Patent [19]

Powilleit

[11] Patent Number: 4,628,841
[45] Date of Patent: Dec. 16, 1986

[54] SINGLE GRAIN SOWING MACHINE

[76] Inventor: Hansherger Powilleit, Am hohlen Berg 4, 4000 Düsseldorf 12, Fed. Rep. of Germany

[21] Appl. No.: 658,807

[22] Filed: Oct. 9, 1984

[30] Foreign Application Priority Data

Oct. 10, 1983 [DE] Fed. Rep. of Germany ....... 3335823
Oct. 10, 1983 [DE] Fed. Rep. of Germany ....... 3336782

[51] Int. Cl.⁴ .................................................. A01C 7/18
[52] U.S. Cl. .......................................... 111/89; 111/2
[58] Field of Search ............... 221/220, 237, 210, 213, 221/217, 218, 235; 111/77, 34, 89–91, 2, 3

[56] References Cited

U.S. PATENT DOCUMENTS

| 2,145,771 | 1/1939 | McCartney | 111/3 |
| 2,348,787 | 5/1944 | Cordes | 111/3 |
| 2,609,767 | 9/1952 | Tapp et al. | 111/3 |
| 3,043,251 | 7/1962 | Jennings | 111/34 X |
| 3,413,941 | 12/1968 | Roberson | 221/218 X |
| 3,561,380 | 2/1971 | Adams | 111/89 |
| 3,982,661 | 9/1976 | Feltrap | 221/235 |
| 4,300,462 | 11/1981 | Wilkins et al. | 111/34 |
| 4,324,347 | 4/1982 | Thomas | 221/237 |

FOREIGN PATENT DOCUMENTS

| 1054861 | 5/1979 | Canada | 111/77 |
| 230326 | 8/1909 | Fed. Rep. of Germany . | |
| 1195080 | 6/1961 | Fed. Rep. of Germany | 111/77 |
| 1457832 | 7/1969 | Fed. Rep. of Germany . | |
| 1582081 | 8/1971 | Fed. Rep. of Germany . | |
| 75683 | 6/1961 | France . | |
| 1291511 | 3/1962 | France | 111/34 |
| 659265 | 6/1964 | Italy | 111/77 |
| 2012534 | 8/1979 | United Kingdom . | |
| 2103463 | 2/1983 | United Kingdom | 111/89 |
| 865166 | 9/1981 | U.S.S.R. | 111/34 |
| 948316 | 8/1982 | U.S.S.R. | 111/3 |

Primary Examiner—Robert A. Hafer
Assistant Examiner—Danton DeMille
Attorney, Agent, or Firm—Finnegan, Henderson, Farabow, Garrett & Dunner

[57] ABSTRACT

Figure 1:
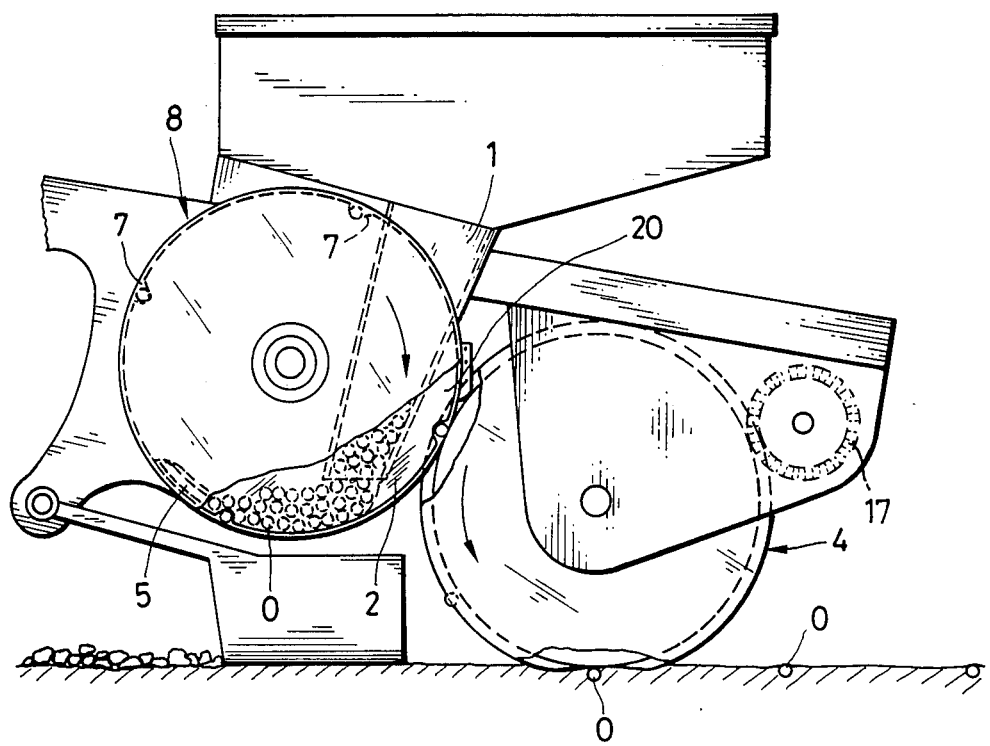

In a single grain sowing machine, the seed grains (0) supplied out of the seed container (1) are separated by means of a feeding wheel (2). This feeding wheel (2) is covered up to a point where it leaves the housing (8). There is also a sowing wheel (4) which rolls on the ground and on the circumference of which there are means which engage the seed grains (0) that are already separated in the cells (7) of the feeding wheel (2) and transfer them out of the cells into the path of movement and the circumferential speed of the sowing wheel (4). The circumferentially measured spacing of the cells (7) of the feeding wheel (2) is to the circumferential spacing of the seed grains (0) held by the means of the sowing wheel (4) as is the ratio of the circumferential speeds of these two wheels. In the lower zone of the sowing wheel (4), the seed grains (0) are pressed into the soil and released (FIG. 1).

23 Claims, 13 Drawing Figures

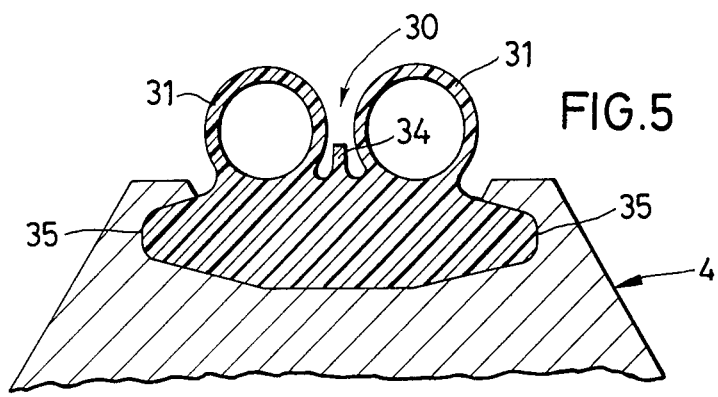
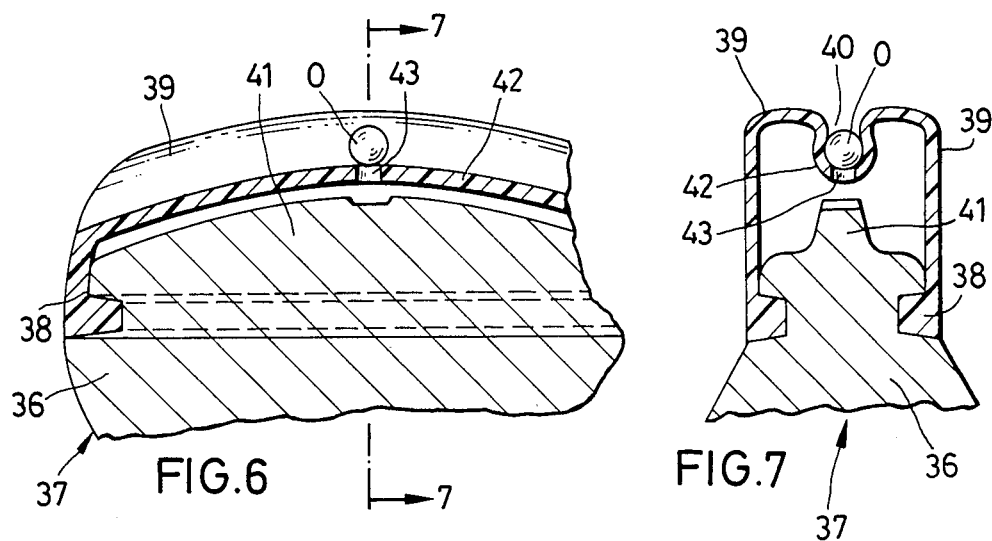

SINGLE GRAIN SOWING MACHINE

The invention relates to a single grain sowing machine comprising a seed container, a feeding wheel with radially outwardly open cells for receiving individual seed grains that is for the most part enclosed by a housing, rotatable about a substantially horizontal axis and has part of its circumference bounding the lower part of the seed container, and a transporting apparatus which is likewise rotatable about a substantially horizontal axis transverse to the driving direction of the sowing machine and which receives in its upper zone the seed grains previously contained in the feeding wheel and discharges them in its lower zone.

To achieve shooting of the seeds on the land approaching the germinating capability in a laboratory, optimum germinating and growth conditions have to obtain on the land even upon sowing. Shooting of the seeds on the land is decisively influenced by the soil temperature and moistness. The soil temperature must exceed the germinating temperature so that germination is initiated. At the same time, there must be enough moistness in the soil to permit germination to start and enable a healthy plant to develop. For this reason, it was already in early times that one thought of reconsolidating the prepared soil during sowing in order to improve the capillary feeding of the water.

Thus, an apparatus is known (U.S. Pat. No. 3,982,661), having in the lower zone of a seed container a conveyor belt which passes over two rollers and the lower run of which runs closely over a circumferential section of a rotating wall. The conveyor belt conveys seed grains out of the seed container into the space between the lower run of the conveyor belt and the wall. In this wall there are receptacles into which tappets engage from radially inwardly and are so controlled by a stationary cam track that, in the lower position of the wall, they are pushed radially outwardly through the receptacles and press the seed grains into the soil.

The known apparatus calls for a considerable constructional expenditure. In addition, the conveyor belt is merely a transporting device which does not separate the seed grains.

Also known, there is an apparatus for depositing seed grains (DE-OS No. 1 457 832), which comprises a feeding wheel rotatable about a horizontal axis. The cells of this wheel are only open radially outwardly. A circumferential section of the wheel extends into a seed container to fill the cells with one seed grain each. The cells are then covered radially outwardly by a housing until they reach a discharge station. At this station, which is disposed in the lower zone of the feeding wheel, the seed grains disposed in the cells fall out under gravity and centrifugal force and reach a gap between two discs which are of flexible material and the axes of which are so offset from each other that these two discs directly lie on each other at one half of their circumference whereas they define a gap of uneven width in the other half. One of the two discs is driven.

The seed grains that have entered the gap are now clamped at the outer rim of the two discs and taken along to a discharge station in the lower zone of these two discs where the grains are released from the discs with the aid of a wedge. The grains are then thrown into the furrow in the soil.

The main disadvantage in this known apparatus is that the seed grains are freely flung at the two discs and then discharged by these into the furrow. Both flinging paths are haphazard and therefore permit inaccuracies to occur in the individual depositing of the grains. In addition, when depositing the seed grains in this known apparatus, they are not pressed into the soil and therefore the desired capillary water supply to the seed grains is not ensured.

Now, it is the problem of the present invention to avoid the disadvantages of the hitherto known apparatuses that are relevant and to provide a single grain sowing machine which is characterised by reliable and exact depositing of the individual grains and simultaneous embedding of the seed grains in the soil.

This problem is solved in a single grain sowing machine of the aforementioned kind in that the transporting apparatus is in the form a sowing wheel and has means which engage the separate seed grains located in the cells, keep the spacing of the grains in an adjustable relationship to the spacing of the cells, take the grains with them, press them into the soil and release them. The feeding wheel may also be a feeding belt.

In a single grain sowing machine of this construction, reliable filling and separation are performed by the feeding wheel. This separation is in no way falsified during transfer to the sowing wheel, during transport in the sowing wheel and when depositing directly on the ground, so that spacing and positioning of the seed grain can be precisely maintained. It is possible to very the relationship between the rotary speeds of the feeding wheel on the one hand and the sowing wheel on the other hand in order thereby to change the spacing of the seed grains. Even during such a variation there is no reduction in the accuracy with which the seeds are deposited. Pressing of the seed grains into the soil ensures accurate placing but also ensures that the resulting consolidation of the soil in the region of the grain will bring about the required capillary effect necessary for initiating germination and the subsequent development of a healthy plant.

The single grain sowing machine according to the invention can also be constructed so that the feeding wheel is in the form of a disc of which the thickness in the cell-containing outer region is substantially equal to or less than the smallest diameter of the seed grains, that the cells are also open in both axial directions and covered by a rear wall at the side remote from the seed container, that the lower zone of the feeding wheel projects from the housing and co-operates with the sowing wheel in this region, that the circumference of the sowing wheel has clamping elements which define between each other a circumferentially extending gap for receiving the circumferential section of the feeding wheel projecting from the housing and exert an elastic pressure on each other to retain the seed grains, and that the clamping elements are constructed and/or arranged to be resilient in the radial direction.

The clamping elements engage the seed grains which are offered by the feeding wheel in predetermined time intervals and/or at predetermined spacings and are therefore transferred to the sowing wheel and pressed into the soil as this wheel rolls on the ground. The sowing wheel may be rotated through contact with the ground or by a central drive.

The single grain sowing machine according to the invention can also be constructed so that the clamping elements are unified to form one structural component.

This particularly simplifies the manufacture and assembly of the clamping elements.

The single grain sowing machine according to the invention can also be constructed so that the clamping elements are elastic rings or annular segments deformable under pressure. These are particularly simple components that are cheap to make.

Further, the single grain sowing machine according to the invention can be constructed so that the clamping elements are two slack tyres. In this way, one prevents the soil from being built up as it rolls along.

Further, the single grain sowing machine according to the invention can be constructed so that the sowing wheel is in the form of a star wheel and comprises a plurality of separate circumferential sections provided with clamping elements. In this way, the soil is provided for each grain with a separate zone in which the desired local environment is produced by surface deformation.

The single grain sowing machine according to the invention can also be constructed so that a suction air connection opens into the gap between the clamping elements. In this way, the retaining forces can if necessary be increased beyond the clamping forces.

The single grain sowing machine according to the invention can also be constructed so that a stripper engages in the gap. This stripper particularly serves to clean the gap between the clamping elements from residues of soil.

The single grain sowing machine according to the invention can also be constructed so that a cleaning brush engages the circumference of the sowing wheel. For certain soil conditions, self-cleaning of the clamping elements may not be sufficient. This could result in the defective transfer of seed grains from the feeding wheel. The cleaning brush as suggested will avoid such defects.

The single grain sowing machine according to the invention can also be constructed so that provision is made in the gap between the clamping elements of a pressure member which is fixed to the sowing wheel to support the seed grains and pressing these into the soil. While the seed grains are being pressed into the soil, the grains have to be supported against the sowing wheel. This can take place at the base of the gap or through a special pressure member disposed between the clamping elements.

The single grain sowing machine according to the invention can also be constructed so that the clamping elements are combined with the pressure member to form one component. With this construction, there are advantages in manufacture and assembly.

The single grain sowing machine according to the invention can also be constructed so that the seed container has a base inclined towards the lower region of the feeding wheel. The desired optimum depositing of single grains primarily depends on reliable separation at the feeding wheel. For this purpose, sufficient quantities of the grains must first of all be supplied to the cells of the wheel. This is achieved by the aforementioned construction of the base of the seed container.

The single grain sowing machine according to the invention can also be constructed so that the angle between the base of the seed container on the one hand and the feeding wheel on the other hand increases upwardly starting from the end of the filling zone up to commencement of lateral covering in the direction of rotation of the feeding wheel. In this way one ensures that separation can take place at the individual cells and the excess grains will radially come off the feeding wheel after the separating zone.

The single grain sowing machine according to the invention can also be constructed so that the rear surfaces of the cells as viewed in the direction of rotation of the feeding wheel form an acute angle with the rear wall. This ensures that the individual seed grains in the cells are retained therein and reliably brought to the position where they are transferred to the sowing wheel.

The single grain sowing machine according to the invention can also be constructed so that the front surfaces and/or rear surfaces of the cells as viewed in the direction of rotation of the feeding wheel are bevelled in the direction of rotation. This serves to achieve reliable transfer of the grains even with differences in the circumferential speeds of the feeding wheels and sowing wheel.

Finally, the single grain sowing machine according to the invention can be constructed so that an oblique surface becoming flatter towards the cells is provided in front of each cell on that surface of the feeding wheel which faces the the seed container. This improves the introduction of the grains into the cells and thus reliable filling of all the cells.

Figure 2:
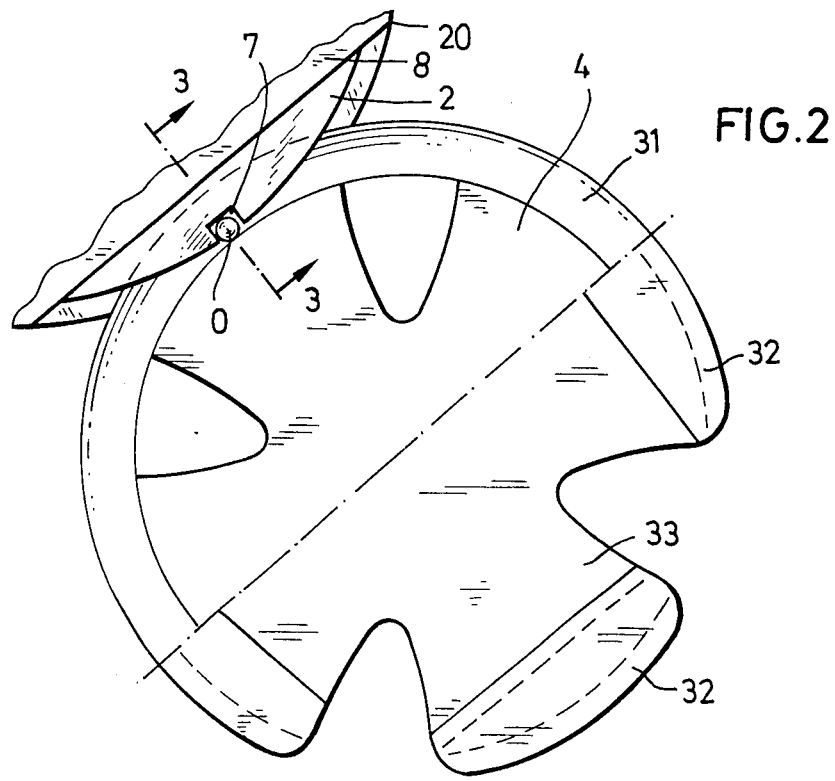
Figure 3:
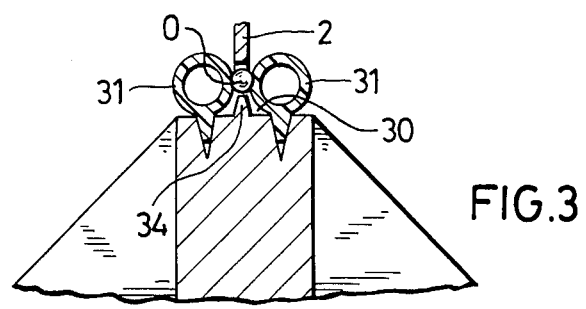
Figure 4:
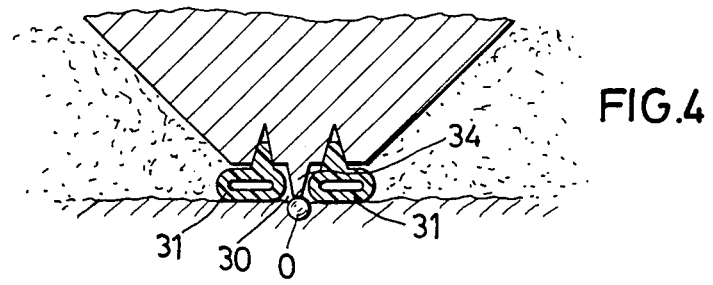
Figure 8:
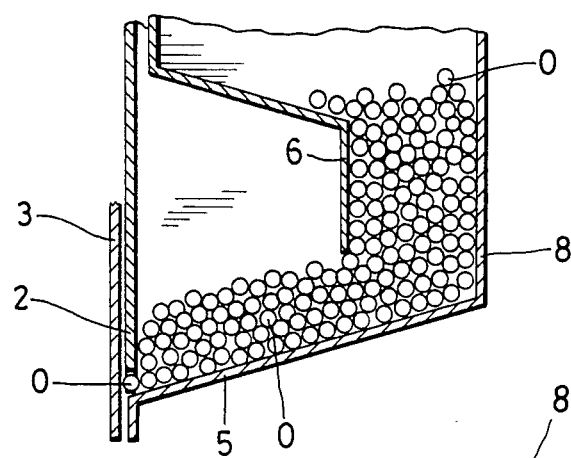
Figure 9:
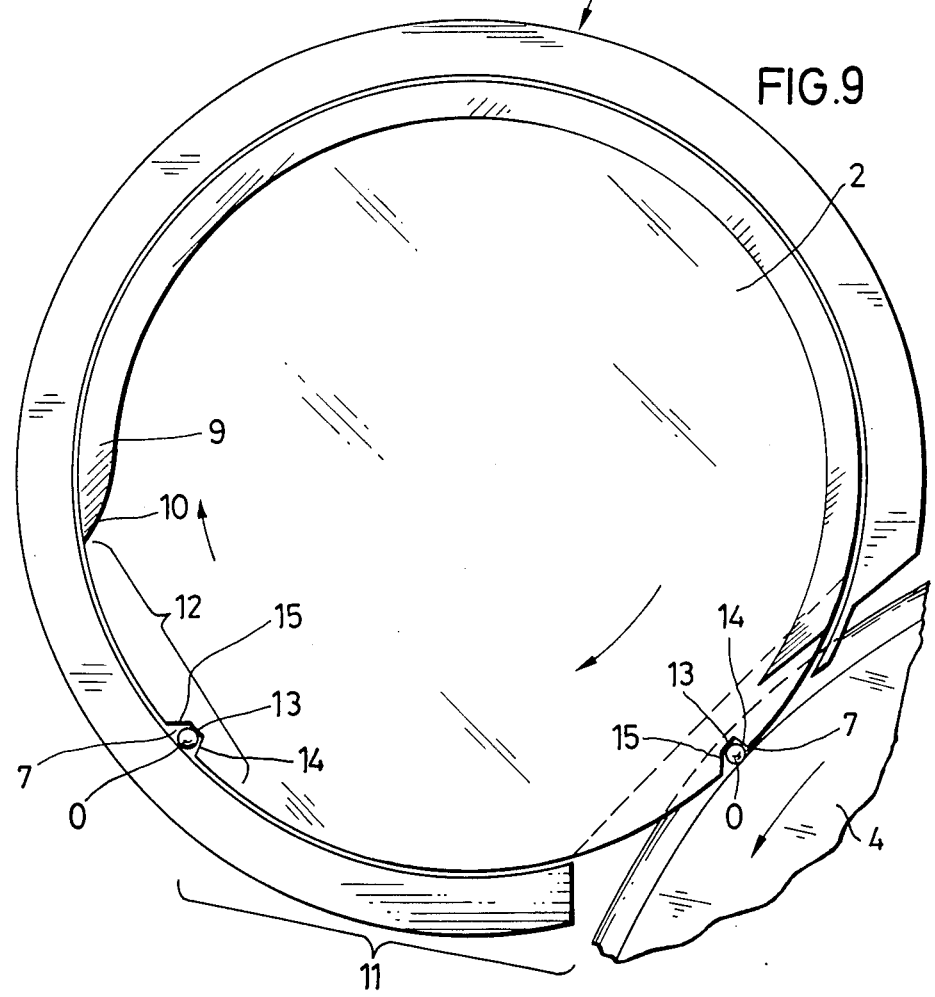
Figure 10:
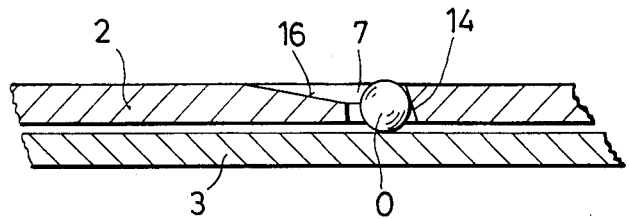
Figure 11:
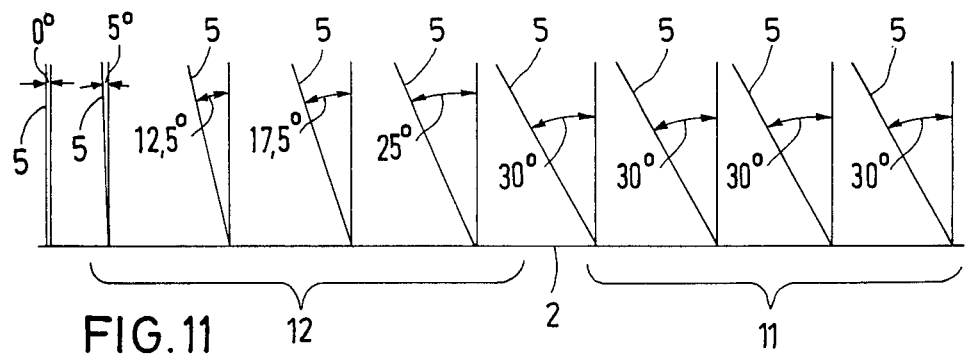
Figure 12:
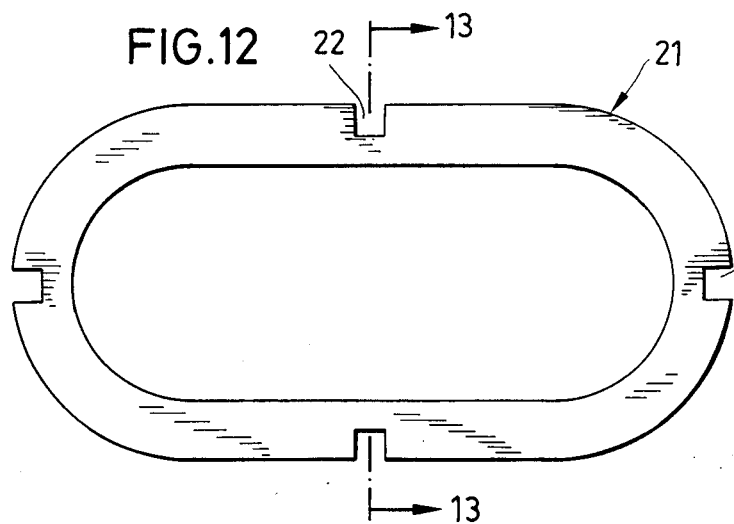
Figure 13:
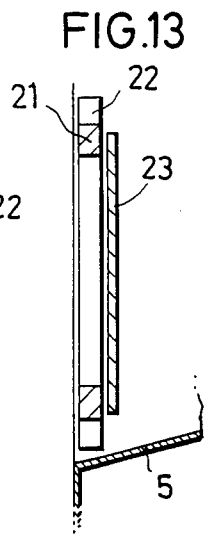

A few embodiments of the invention will be described in the following description with reference to the drawings wherein:

FIG. 1 is a diagrammatic elevation of one embodiment of single grain sowing machine according to the invention, FIG. 2 is an elevation of a sowing wheel in co-operation with the lower section of a feeding wheel of the single grain sowing machine, FIG. 3 is a section on the line 3—3 in FIG. 2, FIG. 4 is a partial section of the sowing wheel with clamping elements pressed on the soil, FIG. 5 is a partial section of the sowing wheel with annular clamping elements and pressure member combined to one component, FIG. 6 is a section through the head of one arm of a star-shaped sowing wheel, FIG. 7 is a section on the line 7—7 in FIG. 6, FIG. 8 is a partial section lying in a vertical plane through the lower end of the seed container and the feeding wheel of the single grain sowing machine according to the invention, FIG. 9 is an elevation in the axial direction of the feeding wheel co-operating with a sowing wheel, FIG. 10 is partial section through the feeding wheel in the region of a cell as well as through the rear wall in the circumferential direction, FIG. 11 shows the change in the inclination of the base of the seed container in relation to the feeding wheel, FIG. 12 is an elevation of a belt-type feeding wheel, and FIG. 13 is a section on the line 13—13 in FIG. 12.

The single grain sowing machine diagrammatically illustrated in FIG. 1 has a seed container 1, a feeding wheel 2, a rear wall 3 (FIG. 8) covering the side remote from the seed container 1, and a sowing wheel 4 which co-operates with the feeding wheel 2 and is mounted to rotate about a substantially horizontal axis.

The seed container 1 is bounded in its lower zone by a base 5 which extends at a downward inclination towards the feeding wheel 2. Terminating at a spacing above the base 5 there is a guide plate 6 which bounds the height of the seed reservoir at the feeding wheel 2. The inclination of the base 5 causes the seed grains 0 to become displaced towards the feeding wheel 2. The seed grains 0 are thereby pressed against the feeding wheel 2.

The feeding wheel 2 is in the form of a disc of which the cells 7 are notches which are open radially outwardly as well as in both axial directions. The feeding wheel 2, which is rotatable about a substantially horizontal shaft (not shown), is covered by the rear wall 3 at the side remote from the seed container 1. In a radially outward direction, the cells 7 are closed by the housing 8. On the side of the feeding wheel 2 facing the housing 8, the cells 7 are covered by a cover 9 only at a position where the cells 7 have been turned further through about 80 degrees relatively to the lowermost position. This cover 9 starts with a separating edge 10 which rises gradually from radially outwardly to radially inwardly.

The inclination of the base 5 represented by an acute angle between this base 5 and the feeding wheel 2 in the lower zone of the seed container changes in the direction of rotation in that the angle between the base 5 and the feeding wheel 2 increases after rushing through the filling path. This ensures that the inclination facilitating entry of the grains 0 into the cells 7 in the lower zone is more or less eliminated in the direction of rotation to achieve a free space for rejecting excess seed grain 0 and thereby simplify the separation.

FIG. 11 shows the change in the angle of inclination between the base 5 of the seed container and the feeding wheel 2. In the zone 11, the inclination remains constant at 30 degrees. In this zone 11 there is still a a desire to fill the cells 7. In the subsequent zone 12, the angle of inclination decreases and the rejection of excessive seed grains 0 is thereby simplified.

The cells 7 have a base surface 13, a rear surface 14 (as viewed in the direction of rotation) and a front surface 15. The rear surface 14 forms together with the rear wall 3 an angle of less than 90 degrees (FIG. 10) in order to retain in the cells 7 a seed grain 0 once it has reached that cell. In front of each cell 7 as viewed in the direction of rotation there is an oblique surface 16 which is inclined towards the cell 7 and thereby simplifies entry of the seed grains 0 into the cells 7 (FIG. 10). The front surface 15 is inclined in the direction of rotation (9), so that the length of the cells 7 as measured in the circumferential direction increases radially outwardly. The thickness of the feeding wheel 2 is less than or substantially equal to the smallest diameter of the grains 0 to be sown. This means that the grains 0 disposed in a cell 7 will be engaged when elastic clamping elements engage both sides of the feeding wheel 2 in the region of a cell 7.

The feeding wheel 2 leaves the housing 8 at 20. The covers of the cells 7 that surround the outer rim of the feeding wheel 2 radially outwardly and laterally accompany the feeding wheel 2 for a short distance beyond the housing 8.

Instead of a feeding wheel 2 one can also employ a feeding belt 21 (FIGS. 12, 13) which likewise has cells 22 in the aforementioned manner and a cover 23.

The feeding wheel 2, which leaves the housing 8 to a certain extent at 20, engages at the zone outside the housing 8 in a gap 30 between two elastic clamping elements 31 secured to the circumference of the sowing wheel 4. The clamping elements 31 are in the form of slack tyres which exert an elastically resilient pressure onto each other and thus onto the two sides of the feeding wheel 2. By reason of their elasticity, they can also be pressed slightly into the cells 7 of the feeding wheel 2. Seed grains 0 disposed in the cells 7 will thus be clamped between the clamping elements 31 and engaged thereby so that they will be necessarily transferred out of the path of movement of the cells 7 into that of the sowing wheel 4 without any possibility of an undesirable change in position. The clamping elements in the form of slack tyres can extend continuously over the entire circumference of the sowing wheel 4 as is shown for the upper half in FIG. 2. According to another embodiment, however, one can also provide clamping elements 32 seated merely on the radially outward ends of the individual arms 33 of sowing wheel 4 in the form of a star wheel (FIG. 2, lower portion).

A cleaning brush 17 serving to clean the sowing wheel 4 and its clamping elements engages the circumference of the sowing wheel.

Between the clamping elements 31 or 32 there is a radially outwardly projecting pressure member 34.

In the zone where the sowing wheel 4 comes into contact with the ground and radial forces are exerted on the clamping elements 31, 32, these elements are compressed. This leads to the pressure member 34 here projecting outwardly between the clamping elements 31, 32 and pressing into the soil the seed grain 0 which is now released by the clamping elements 31, 32.

According to FIG. 5, two clamping elements 31 in the form of slack tyres are made in one piece with a pressure member 34 lying therebetween in the region of the gap 30 and inserted in a complementary receptacle or groove 35 at the circumference of the sowing wheel 4.

FIGS. 6 and 7 illustrate the head 36 of one arm 37 of a star-shaped sowing wheel 4. Placed on this head 36 there is a cap 38 having two clamping elements 39. These clamping elements 39 are beads of resilient material defining between each other a gap 40 for clamping and retaining seed grains 0. A pressure member 41 engages in the space below the gap 40. If, now, the clamping elements 39 receive a radially directed pressure while rolling along the ground, they are correspondingly deformed. The base 42 of the gap 40 is supported on the pressure member 41 and thereby presses the seed grain 0 radially outwardly past the clamping elements 39 into the earth.

The cap 38 is in the form of a hollow member and can be connected to a vacuum line (not shown). A bore 43 is provided in the base 42 of the gap 40. The vacuum within the cap 38 acts through the bore 43 and increases the retaining forces acting on the seed grains 0 by way of the created clamping forces.

I claim:

1. A single grain sowing machine comprising a housing, a seed container, a feeding wheel in the form of a disc rotatable within the housing about a substantially horizontal axis, said feeding wheel having a plurality of radially outwardly open cells spaced around its periphery that are also open on both sides of the cells, said feeding wheel and being of a thickness in the region of the cells no larger than the smaller diameter of the seed grains, said seed container delivering a plurality of seeds to a filling zone on one side of said feeding wheel, while the other side of the wheel is bounded by a wall of the housing whereby the cells receive individual seed grains at the filling zone, and rotation of the feeding wheel transports the seeds in the cells one at a time away from the filling zone to a transfer zone where the feeding wheel projects out of the housing, a sowing wheel also rotatable about a substantially horizontal axis transverse to the driving direction of the sowing machine that cooperates with the feeding wheel in the transfer zone to receive individual seed grains from the cells of the feeding wheel in an upper zone of the path of rotation of the sowing wheel and which discharges them into the soil in a lower zone, said sowing wheel being provided around its circumference with resilient clamping elements which define between each other a circumferentially extending gap that receives the peripherial portion of the feeding wheel in the transfer zone, said resilient elements exerting pressure toward each other to grip a seed in a cell of the feeding wheel as the wheels rotate and the feeding wheel passes through the gap to thereby remove the seeds one at a time from the cells, said clamping elements also being resilient in the radial direction so that as the sowing wheel rotates to the lower zone, the elements are pressed against the soil whereby the elements deform to release the seeds which are then pressed into the soil by the pressure of the sowing wheel.

2. The single grain sowing machine of claim 1 wherein the clamping elements are integral with one another to form one component.

3. The single grain sowing machine of claim 1 or 2 in which the clamping elements are elastic rings that extend continuously around the periphery of the sowing wheel and are deformable under pressure.

4. The single grain sowing machine of claim 1 or 2 in which the clamping elements are elastic ring segments spaced around the periphery of the sowing wheel that are deformable under pressure.

5. The single grain sowing machine of claim 1 or 2 wherein the clamping elements are in the form of a pair of slack tires.

6. The single grain sowing machine of claim 1 or 2 in which the sowing wheel is in the form of a star wheel and comprises a plurality of separate circumferential sections provided with the clamping elements.

7. The single grain sowing machine of claim 1 or 2 including a suction air connection that opens into the gap between the clamping elements.

8. The single grain sowing machine of claim 1 or 2 including a stripper that engages in the gap.

9. The single grain sowing machine of claim 1 or 2 including a cleaning brush that engages the circumference of the sowing wheel to clean the gap between the clamping elements.

10. The single grain sowing machine of claim 1 or 2 including a pressure member fixed to the sowing wheel and projecting into the gap between the clamping elements to support the seed grains as they are held by the elements and to press these grains into the soil as they are released by the elements being deformed in the radial direction.

11. The single grain sowing machine of claim 1 or 2 including a pressure member fixed with respect to the sowing wheel and projecting into the gap between the clamping elements, said member being integral with the clamping elements to form one component that supports the seed grains in the sowing wheel during transport and that presses the grains into the soil after they are released.

12. The single grain sowing machine of claim 1 or 2 in which the seed container has a base inclined toward the filling zone which is located in a lower zone of the path of rotation of the feeding wheel.

13. The single grain sowing machine of claim 1 or 2 in which the angle between the base of the seed container and the adjacent side of the feeding wheel increases upwardly starting from the filling zone in the direction of rotation of the feeding wheel.

14. The single grain sowing machine of claim 1 or 2 in which the rear surfaces of the cells in the direction of rotation of the feeding wheel form an acute angle with the wall of the housing at the side of the feeding wheel remote from the container.

15. The single grain sowing machine of claim 1 or 2 in which the front surfaces of the cells in the direction of rotation of the feeding wheel are bevelled in the direction of rotation.

16. The single grain sowing machine of claim 1 or 2 in which the front wall of each cell as viewed in the direction of rotation of the feeding wheel has an upwardly inclined surface on the side of the feeding wheel facing the seed container that assists in channeling seeds into the cells in the filling zone.

17. The single grain sowing machine of claim 1 in which the seed container has a base inclined towards the filling zone which is located in the lower zone of the path of rotation of the feeding wheel, the clamping elements are in the form of a pair of slack tires and including a pressure member fixed to the sowing wheel that projects into the gap between the clamping elements to support the seed grains during transport and to press these grains into the soil as the elements are deformed in the radial direction.

18. The single grain sowing machine of claim 17, including a suction air connection that opens into the gap between the clamping elements.

19. The single grain sowing machine of claim 17, including a stripper that engages in the gap.

20. The single grain sowing machine of claim 17, in which the angle between the base of the seed container and the adjacent side of the feeding wheel increases upwardly starting from the filling zone in the direction of rotation of the feeding wheel.

21. The single grain sowing machine of claim 17, in which the rear surfaces of the cells in the direction of the rotation of the feeding wheel form an acute angle with the wall of the housing at the side of the feeding wheel remote from the container.

22. The single grain sowing machine of claim 17, in which the front surfaces in the direction of rotation of the feeding wheel are bevelled in the direction of rotation.

23. The single grain sowing machine of claim 17, in which the front wall of each cell in the direction of rotation of the feeding wheel has an upwardly inclined surface on the side of the feeding wheel facing the seed container that assists in channeling the seeds in the cells in the filling zone.

* * * * *